US007051222B2

(12) United States Patent
Wyatt et al.

(10) Patent No.: US 7,051,222 B2
(45) Date of Patent: May 23, 2006

(54) ROBUST COMPUTER SUBSYSTEM POWER MANAGEMENT WITH OR WITHOUT EXPLICIT OPERATING SYSTEM SUPPORT

(75) Inventors: David A. Wyatt, San Jose, CA (US); Mark A. Blake, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 495 days.

(21) Appl. No.: 10/335,184

(22) Filed: Dec. 31, 2002

(65) Prior Publication Data

US 2004/0128569 A1   Jul. 1, 2004

(51) Int. Cl.
*G06F 1/32*   (2006.01)
*G06F 13/10*  (2006.01)
(52) U.S. Cl. .................. 713/323; 713/320; 719/323
(58) Field of Classification Search ........... 713/300, 713/330
See application file for complete search history.

(56) References Cited

U.S. PATENT DOCUMENTS

| | | | | |
|---|---|---|---|---|
| 5,638,541 | A * | 6/1997 | Sadashivaiah | 710/306 |
| 6,615,288 | B1 * | 9/2003 | Herzi | 710/10 |
| 6,697,033 | B1 * | 2/2004 | Leung et al. | 345/5 |
| 6,907,521 | B1 * | 6/2005 | Saw-Chu et al. | 345/519 |
| 2003/0063071 | A1 * | 4/2003 | Wyatt | 345/172 |

OTHER PUBLICATIONS

Intel Corporation/Microsoft, "APM BIOS Interface Specification", Revision 1.2, Feb. 1996 (75 pages).

Compaq et al, "Advanced Configuration and Power Interface Specification", Revision 2.0b, Oct. 11, 2002 (484 pages).

* cited by examiner

*Primary Examiner*—Lynne H. Browne
*Assistant Examiner*—Anand B. Patel
(74) *Attorney, Agent, or Firm*—Derek J. Reynolds (57) ABSTRACT

Methods and devices for power management of graphics or other computer subsystems are disclosed. In one embodiment, graphics software components are configurable in a manner that allows them to place the graphics subsystem is a "safe" state prior to a suspend event, and back into a "working" state after a resume event, without explicit support from an operating system (OS) power management driver. When operating in the absence of an OS-supplied driver, the graphics driver receives notification of power management events, and sends a message to a support application, which then causes the graphics to enter a quiescent state by taking exclusive ownership of the display and issuing standard device-independent OS graphics calls (for a power-down event) or to relinquish display ownership (for a power-up event). From within this quiescent state the graphics may be safely power managed without adverse effects to the graphics chips and without creating any instabilities in other graphics applications. These graphics software components detect the level of power management provided by the OS during system initialization, and self-configure such that an appropriate graphics power management scheme is in place for whatever level of power management is supplied—or not supplied—by the operating system.

30 Claims, 11 Drawing Sheets

ROBUST COMPUTER SUBSYSTEM POWER MANAGEMENT WITH OR WITHOUT EXPLICIT OPERATING SYSTEM SUPPORT

FIELD OF THE INVENTION

This present invention relates generally to computer power management, and more particularly to managing power for subsystems, such as graphics, in the absence of explicit operating system support.

BACKGROUND

All computer systems require electrical power to operate. In many instances, it is desirable to manage electrical power to a computer system, responsive to near-term requirements or observed usage, prior settings, etc. For instance, a computer may be configured such that after some number of minutes without activity, the computer may spin down its hard drives, remove power from its graphics output, power down its network interface card(s), slow or halt its central processing unit, etc. After additional time passes, the computer may automatically enter a suspend state where, except for low-power memory self-refresh operations, all computer functions draw essentially zero current. The computer may even be placed in a hibernate state, where an image of memory is saved to hard disk and the computer is completely powered down, with its hibernation state saved indefinitely.

For portable, battery-powered computers, power management is almost essential if the computer is expected to run on battery power for more than an hour or two. And even with stationary computers that rely on a building's electrical power supply, significant reductions in electricity usage are possible with computers that utilize effective power management.

Figure 1:
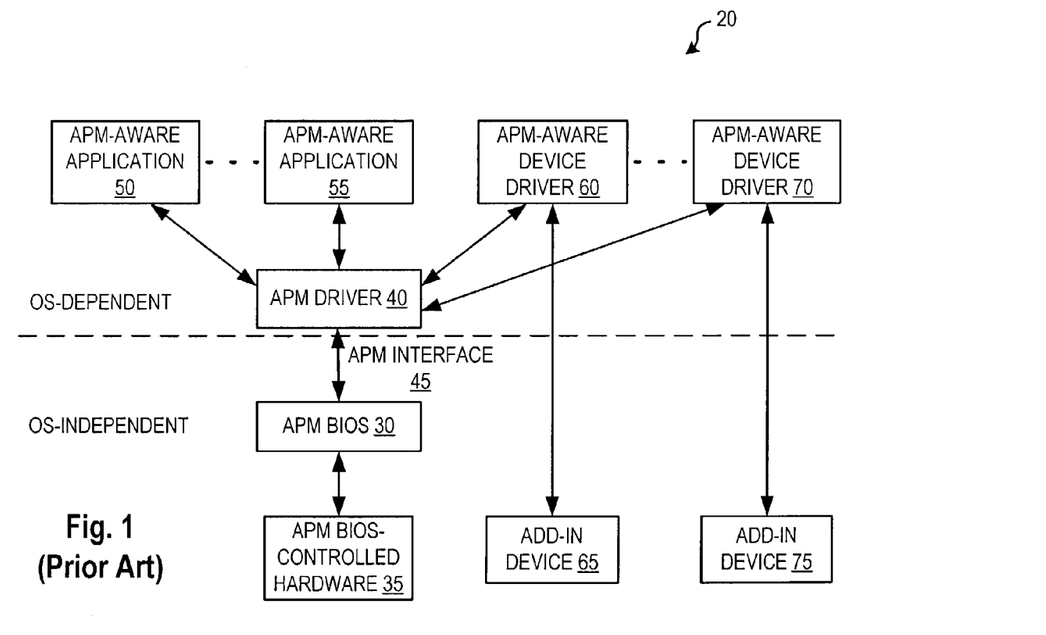
FIG. 1 illustrates basic software layering for a prior-art APM implementation.

Several specifications have been developed in the interest of effecting robust computer power management. Intel Corporation and Microsoft Corporation released one such specification that has enjoyed wide adoption, *Advanced Power Management (APM) BIOS Interface Specification*, Rev. 1.2, February 1996 (and previous versions). FIG. 1 illustrates the general structure of an APM implementation. An APM BIOS (Basic Input/Output System) 30 provides a software interface to those power-managed hardware subsystems 35 located in the standard computer configuration (e.g., motherboard devices and some attached components).

Although some limited power management is often possible with the APM BIOS alone, more comprehensive power management generally requires the cooperation of an operating-system-resident APM driver. An APM interface 45 is standardized for operating system (OS) communication with APM-compliant BIOS software. An operating system vendor desiring to utilize APM functionality supplies an APM driver 40 that also complies with the APM interface specification. The APM driver calls APM BIOS functions to accomplish APM tasks. The APM BIOS expects to be polled frequently (e.g., at least once/second) by the APM driver for the occurrence of power management events.

For each OS using an APM driver, the OS vendor determines how it will involve APM-aware applications (e.g., 50 and 55), and in some cases APM-aware device drivers (e.g., 60 and 70) that provide power control for an add-in device (e.g., 65 and 75), such as a PCI (Peripheral Component Interconnect) device. In many Microsoft Windows® OS implementations, for instance, APM driver 40 places messages in the message loop of registered applications, to notify the applications of a power event. The messages allow those applications to take necessary actions before a power event occurs, or in some cases to even prevent the power event from occurring.

A second, more ambitious approach to power management is described in *Advanced Configuration and Power Interface Specification*, Rev. 2.0a, Mar. 31, 2002, hereinafter referred to as ACPI. ACPI uses different interrupt mechanisms than APM, and defines global system states, device power states, and processor power states. A more detailed understanding of ACPI is not necessary for understanding of the invention described herein, as embodiments of the present invention generally solve problems not present with ACPI systems.

BRIEF DESCRIPTION OF THE DRAWING

The embodiments may be best understood by reading the disclosure with reference to the drawing, wherein.

DETAILED DESCRIPTION OF THE EMBODIMENTS

Some operating systems provide support for APM and/or ACPI. Some do not. Most computer users do not understand—or expect to have to understand—such subtleties, but simply expect an extant and robust power management scheme on their computer, regardless of whether the support is provided by the operating system or not. Thus hardware manufacturers almost inevitably provide an APM BIOS with their systems. Some even provide an OS-independent third-party PM (power management) driver in an attempt to provide wider PM support. Unfortunately, many computer subsystems (such as graphics, network interfaces, disk controllers) tend to be highly complex, cached, and/or pipelined, sensitive to the manner in which power transitions occur, and not necessarily well understood by system manufacturers. It is recognized herein that it would be desirable to have such subsystems participate in their own power transition preparation, whether under the control of a driver for APM, ACPI, or some other PM, or even in the absence of any PM driver. And yet no mechanism currently exists for universal and automatic participation of a subsystem in power management under all OS support scenarios.

This description presents embodiments of such a mechanism in the context of a graphics subsystem. This mechanism generally senses whether a resident APM or ACPI driver is available to support graphics subsystem power management. When such a driver is unavailable, the software components of the graphics subsystem automatically coordinate with the system BIOS and/or a PM driver to effectuate robust graphics power transitions.

Figure 2:
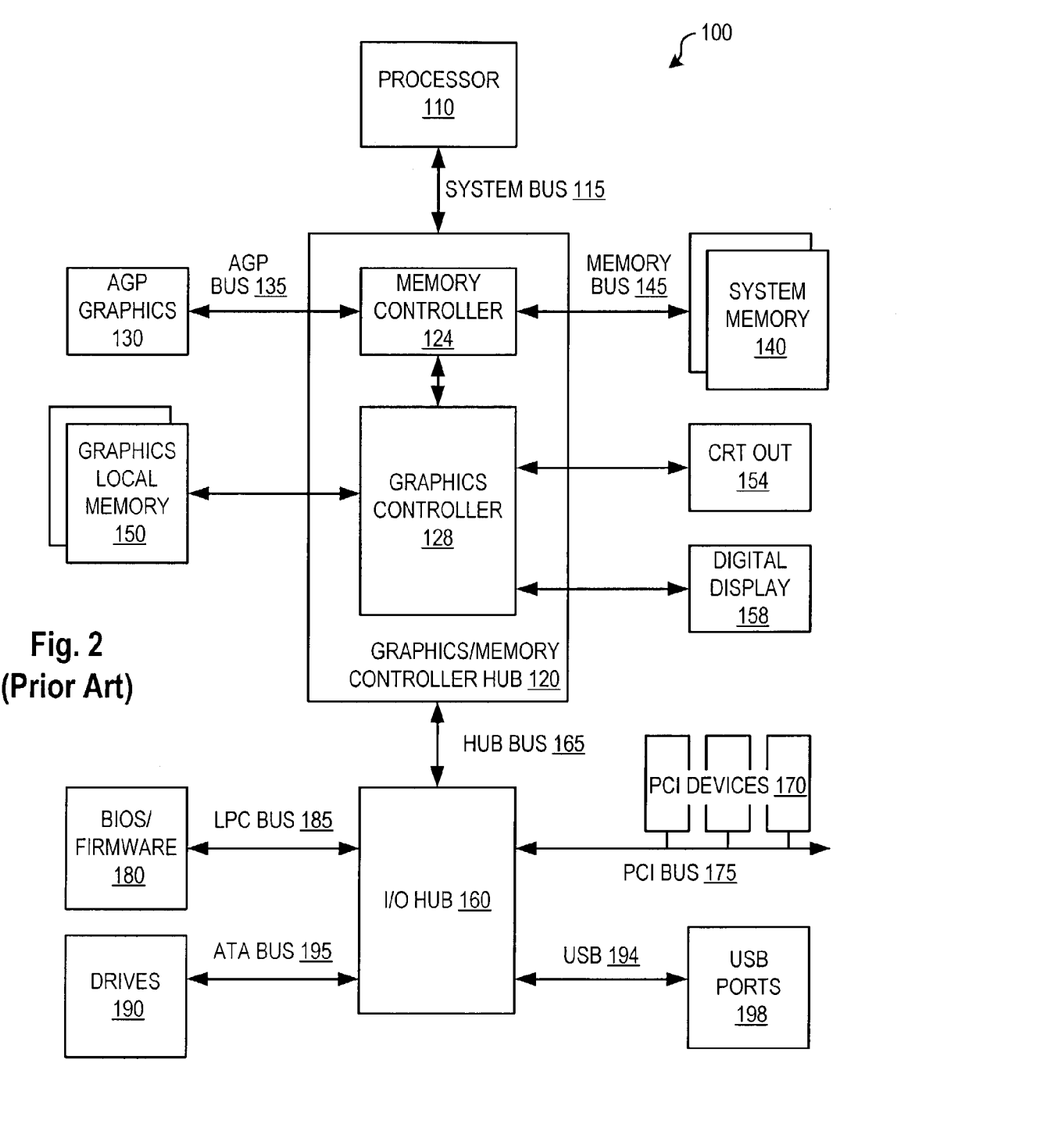
FIG. 2 shows a block diagram for an exemplary computer system to which an embodiment of the present invention may be applied.

To provide a reference context for the embodiments, FIG. 2 depicts a block diagram for one exemplary computer system 100 to which an embodiment of the invention applies. In system 100, a processor 110 (or multiple such processors, and often including local cache memory embedded on the processor), handles the primary computing tasks for system 100. Other subsystems communicate with processor 110 across system bus 115.

Graphics/memory controller hub (GMCH) 120 and I/O (Input/Output) hub 160 are often referred to as a chipset. The chipset typically provides some computer subsystem functionality, provides for orderly and efficient access by processor 110 to system memory 140 and other computer subsystems, and also allows other computer subsystems to access some portions of system memory. GMCH 120 communicates with processor 110 across system bus 115. I/O hub 160 communicates with GMCH 120 across hub bus 165.

GMCH 120 typically supports multiple high-speed bus interfaces in addition to system bus 115 and hub bus 165. The GMCH includes a memory controller 124 that communicates with system memory 140 across memory bus 145. An AGP (Accelerated Graphics Port) interface supports AGP bus 135, and, when included, an AGP graphics device 130. GMCH 120 includes an embedded graphics controller 128 that has access not only to the memory controller, but also to graphics local memory 150, and provides output via a CRT out connector 154 and/or a bus to a digital display 158. (It is noted that when an AGP graphics device is used, graphics local memory 150 and display outputs 154 and 158 generally connect directly to the AGP graphics device).

I/O hub 160 provides for attachment of other devices to the computer system. Low Pin Count (LPC) bus 185 provides an interface to BIOS storage and other firmware 180. PCI (Peripheral Component Interconnect) bus 175 generally provides slots for connecting one or more PCI devices 170 (e.g., audio cards, network cards, video cards, etc.) to system 100. ATA (AT Attachment) bus 195 provides an interface to fixed and removable media disk drives, tape drives, etc. USB (Universal Serial Bus) 194 connects a USB root hub (e.g., on I/O hub 160) to one or more USB ports 198, which support a wide range of peripherals that are generally hot-swappable.

In additional to read/write disk drives and system memory, sensitive state information may exist in other subsystems. For instance, modern graphics controllers and AGP graphics devices often support sophisticated hardware capabilities for off-loading graphics tasks from processor 110 (tasks such as overlay, texturing, shading, z-buffering, digital video motion compensation and block decoding, and other rendering operations). Such graphics devices may support internal graphics pipelines and maintain context pointer tables to textures, objects, and other graphical data cached in memory. Without an orderly shutdown and resumption procedure, a graphics subsystem performing such tasks for the processor would likely hang a computer system responding to power management events.

Figure 3:
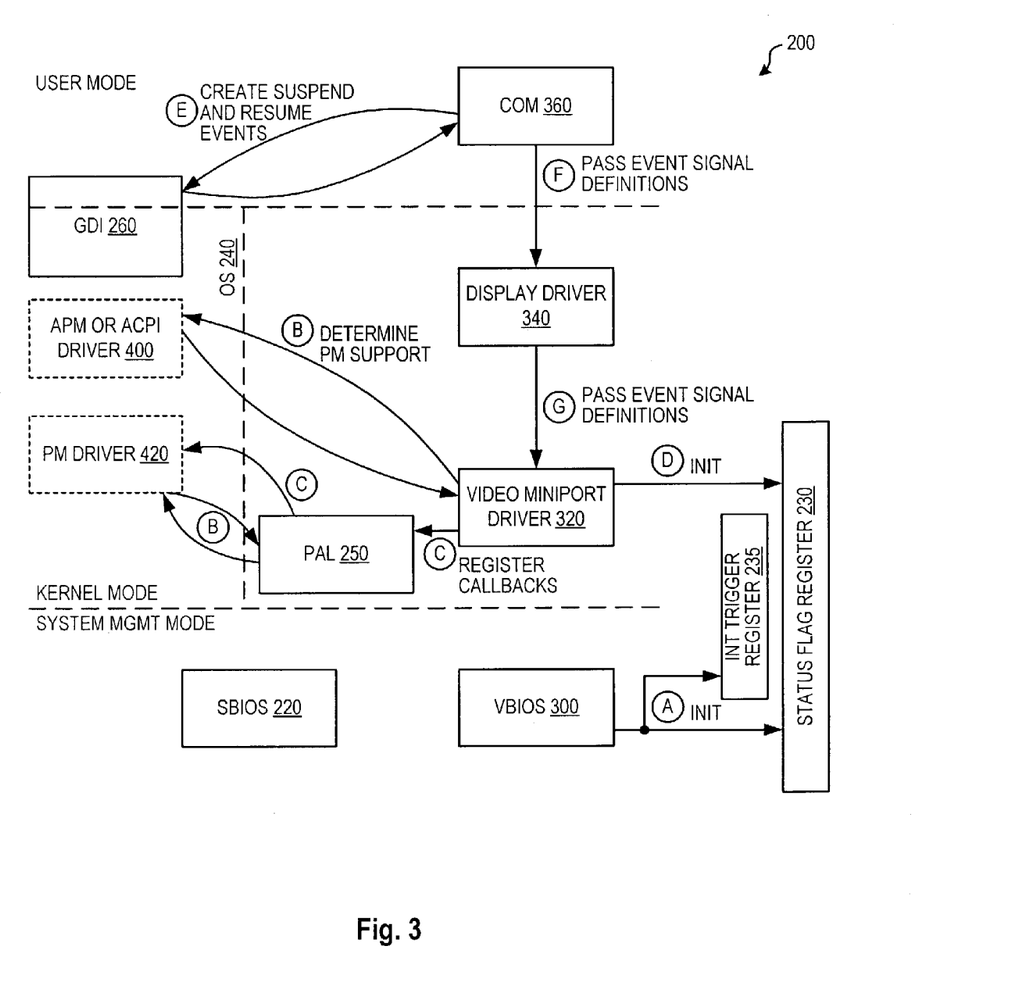
FIG. 3 shows components of an embodiment of the invention and other related software, and illustrates communications that occur at initialization.

FIG. 3 shows several software and register components of a computer system, in a configuration 200 useful in an embodiment of the present invention. The software components are generally classified in FIG. 3 according to the mode in which they run during power management operations: System BIOS (SBIOS) 220 and video BIOS (VBIOS 300) run in System Management Mode (SMM); most other components run in Kernel Mode, including Graphics Device Interface (GDI) 260, an APM or ACPI driver 400 (if included), a PM driver 420 (if included), and three display driver components, a display driver 340, a PAL (Platform Abstraction Layer) 310, and a video miniport driver 320; the COM component 360 runs in user mode (GDI 260 has a user-mode component as well). Two registers are also used for graphics power management-status flag register 230 and interrupt trigger register 235. Each component will be briefly described in turn as it relates to power management, followed by a description of component interaction.

SBIOS 220 is a system-level component that receives (or generates) low-level PM events, and physically controls the power to computer subsystems. SBIOS 220 may, e.g., include an APM BIOS, and provides some sort of handshaking mechanism to communicate PM events to other software components.

VBIOS 300, PAL 310, video miniport driver 320, display driver 340, and COM 360 are each part of the graphics software stack. VBIOS 300 controls the graphics hardware configuration, and is generally provided by the maker of that hardware. As it relates to this embodiment, VBIOS 300 is responsible for maintaining some parts of status flag register 230, initiating interrupts using register 235, and providing PM handshaking with SBIOS 220 when a PM driver is absent from the system.

PAL 310 is a software component capable of exposing interfaces from a PM driver, and exchanging signaling with such a driver. When a third-party PM driver is used for power management, PAL 310 provides an interface between the PM driver and video miniport driver 320.

Although video miniport driver 320 and display driver 340 are shown and described as separate software components, this distinction is largely one of convenience as it follows Microsoft conventions—these drivers function together as a single "graphics driver", and may be considered as such. Different display drivers may sometimes be paired with a miniport driver, or vice versa, to yield different "graphics driver" configurations.

Display driver 340 provides rendering services, working in conjunction with GDI 260 and providing a direct interface to video frame buffers and/or other video memory. Display driver 340 knows what rendering commands are supported by the graphics adapter/controller/processor, and hooks those commands that are supported by graphics hardware; all other rendering commands are left for GDI 260 to process. In the described embodiments, the display driver is largely unmodified, except for a few tasks that will be discussed below.

Video miniport driver 320 is the kernel mode graphics component that interfaces with the OS for non-GDI operations. Video miniport driver 320 manages video resources, maps graphics memory to standard memory address, performs hardware mode set operations and other hardware-peculiar operations, and responds to hardware interrupts. In the described embodiments, miniport driver 320 becomes a middleman in graphics power management.

COM 360 is preferably a user-mode application, such as a hot-key or display-setting application that is, e.g., resident in the background. COM 360 is usually distributed with and loaded along with the graphics driver components. Although COM 360 can in some embodiments notify the user of impending graphics shutdown and/or allow a user to turn off graphics manually, the primary purpose of COM 360 in the described embodiments is to work with miniport driver 320 and the OS to set the graphics to a safe state for graphics transitions.

GDI 260 is the OS component that provides a device-independent graphics interface to applications. While various functions present in GDI 260 are leveraged during graphics power management, GDI 260 will not typically need modification to work with an embodiment of the invention.

APM or ACPI driver 400, and PM driver 420, are optional components that provide power management. When a PM driver 420 is present, video miniport driver 320 works with the PM driver to effect graphics power management. When an APM or ACPI driver is present, that driver is expected to place graphics in a quiescent state. The inclusion of such a driver generally pre-empts graphics-state-saving operations initiated by video miniport driver 320.

Status Flag register 230 is a software-writeable static register that is accessible to the kernel mode and system management mode components of the graphics subsystem. This register may be, e.g., an I/O register, a memory-mapped I/O register, or a register located in the PCI configuration space of the GMCH (or other graphics processor). Status Flag register 230 provides a mechanism for the video BIOS and graphics driver to communicate power management information between their respective contexts. All graphics software components may read the information stored in register 230, and obtain the value of a flag by applying an appropriate bit mask to the register information. The flags are divided into two sets, depending on which component is allowed to modify those flags.

The first two flags are set by the video BIOS to inform the driver of pending power events, and are reset by the driver once it has received and begun action on the information. The flag description is as follows:

| Name | Size/Default | Description |
| --- | --- | --- |
| APM Power State | Size = 3 bits Default = 0h | Set by the Video BIOS to: 0 - No change in status 1 - System is transitioning to APM Standby 2 - System is transitioning to APM Suspend 3 - System is transitioning to APM Hibernate 4 - System is transitioning to APM Resume Reset by a driver to: 0 - After receiving the flag and initiating an appropriate graphics transition |
| APM Request | Size = 1 bit Default = 0h | Set by the Video BIOS to: 0 - When no Switch Display event is pending 1 - When a Switch Display has occurred or is required Reset by a driver to: 0 - to indicate that the change has been registered, when the Video BIOS is responsible for performing the switch 0 - to indicate that the driver has switched mode, when the driver is responsible for performing the switch |

The remaining flags are set by the graphics driver (usually by the video miniport driver). The Video BIOS can read these flags, but is not allowed to change them:

| Name | Size/Default | Description |
| --- | --- | --- |
| Driver-Controlled OS | Size = 1 bit Default = 0h | 0 - No OS is loaded (or a non-driver OS, e.g., DOS, is loaded) 1 - An OS that uses drivers has loaded (the video miniport driver sets this flag when it loads) |
| APM OS | Size = 2 bits Default = 0h | 0 - Unknown APM support 1 - APM 1.1-supported OS 2 - APM 1.2-supported OS 3 - PM driver (but not APM 1.1 or 1.2) |
| APM Status | Size = 2 bits Default = 0h | Set by Display Driver after receiving an APM request 0 - No change 1 - Save or Restore operation is pending 2 - Save or Restore operation completed successfully 3 - Save or Restore operation failed |
| ACPI OS | Size = 2 bits Default = 0h | 0 - Unknown ACPI support 1 - ACPI 1.0b supported 2 - ACPI 1.0b & Video Extensions supported 3 - ACPI 2.0 & Video Extensions supported |
| APM BIOS Memory Allocated | Size = 1 bit Default = 0h | 0 - Graphics State is saved through OS drivers, state-saving memory not allocated for use by Video BIOS 1 - Driver has allocated state-saving memory for use by Video BIOS, address/length stored in registers |
| Pipeline State Saved | Size = 1 bit Default = 0h | Valid when APM BIOS Memory Allocated bit is set 0 - Video BIOS should save MMIO state and 3D pipeline state 1 - Video BIOS should save MMIO state; 3D pipeline state saved by driver |

The use for each of these flags will become more apparent in the following description. It is noted at the outset, however, that the APM BIOS Memory Allocated flag refers to two other registers not shown in FIG. 3—registers for storing a base address and the number of 4-Kbyte pages starting at that address that have been allocated for use by the Video BIOS to save graphics state to memory.

Interrupt Trigger Register 235 can be a register dedicated for use in responding to PM events. Alternately, it can be a register used for other graphics interrupts, where the video miniport driver reads other register values upon receiving an interrupt in order to discover that it has been interrupted for a PM event. Referring back to FIG. 3, tasks that run at system initialization, according to an embodiment of the invention, are indicated. Each will be described in turn.

When VBIOS 300 loads, it performs task A. Task A initializes status flag register 230 to all zeros, and resets interrupt trigger register 235.

As the operating system loads, video miniport driver 320 and PAL 310 load. In its initialization routines, miniport driver 320 executes task B by attempting to connect to an APM or ACPI driver. Likewise, PAL 310 attempts to communicate with a PM driver 420.

If a PM driver is present, PAL 310 executes task C to register for notification of PM events. With some PM drivers, task C involves the PAL calling an interface defined by the PM driver, in essence issuing an Interrupt Request Packet (IRP) to PM driver 420, requesting callback upon the occurrence of a power event. With other PM drivers, task C may involve the PAL registering with the kernel message stack to receive an IRP or IOCTL (Input/Output Control) command when the PM driver places a power management event on the stack. On video miniport driver 320, task C involves registering with PAL 310 for a callback when the PAL is notified of a PM event. This registration is only necessary if cooperation with a PM driver will be the method of power management.

Task D includes setting status flags in flag register 230 to indicate the power management mode for this boot session. The Driver-Controlled OS flag is set to indicate that the miniport driver has loaded. The APM OS flag is set to the proper state if an APM or PM driver has been detected. The ACPI OS flag is set to the proper state if an ACPI driver has been detected. If the miniport driver determines that the video BIOS will be used to save graphics state, it allocates memory for that purpose, saves the base address and memory size to predefined registers accessible to the video BIOS, and sets the APM BIOS Memory Allocated flag. If the video BIOS is to save the graphics pipeline state, miniport driver 320 ensures that the Pipeline State Saved flag is reset.

It is noted that if the video miniport driver never loads, the flags in status flag register 230 remain set to zero, indicating to the video BIOS that it should not use the miniport driver interrupt, as the driver has not loaded. Consequently, the video BIOS would not attempt to handle power management events.

COM 360 loads as a user-mode application when other user startup applications load. When COM 360 loads, one of its initialization tasks is task E. Task E calls OS functions to create event handles for power suspend and resume events. These events will be referred to herein by the names APMSuspendEvent and APMResumeEvent. It is noted, however, that any event names not already reserved by the OS will work, so long as the software components that use those events have knowledge of the selected names. Task F passes the event and associated semaphore handles to display driver 340, e.g., with an ExtEscape function call in the Microsoft family of operating systems. The display driver executes task G to pass the event and semaphore handles down to the miniport driver 320, e.g., with an IOCTL function call. Upon receiving these event and semaphore handles, video miniport driver 320 knows: that the upper software layers have been configured to help respond to power management events; how to signal COM 360 when events occur; and what semaphores indicate that COM 360 has caused a graphics reset.

Once the components of configuration 200 have been initialized, the system is ready to respond to power management events. Note that the initialization process has automatically configured the graphics subsystem to respond to graphics power management events in an appropriate way, no matter what operating system has loaded and what power management support (if any) is provided by that operating system.

Figure 4:
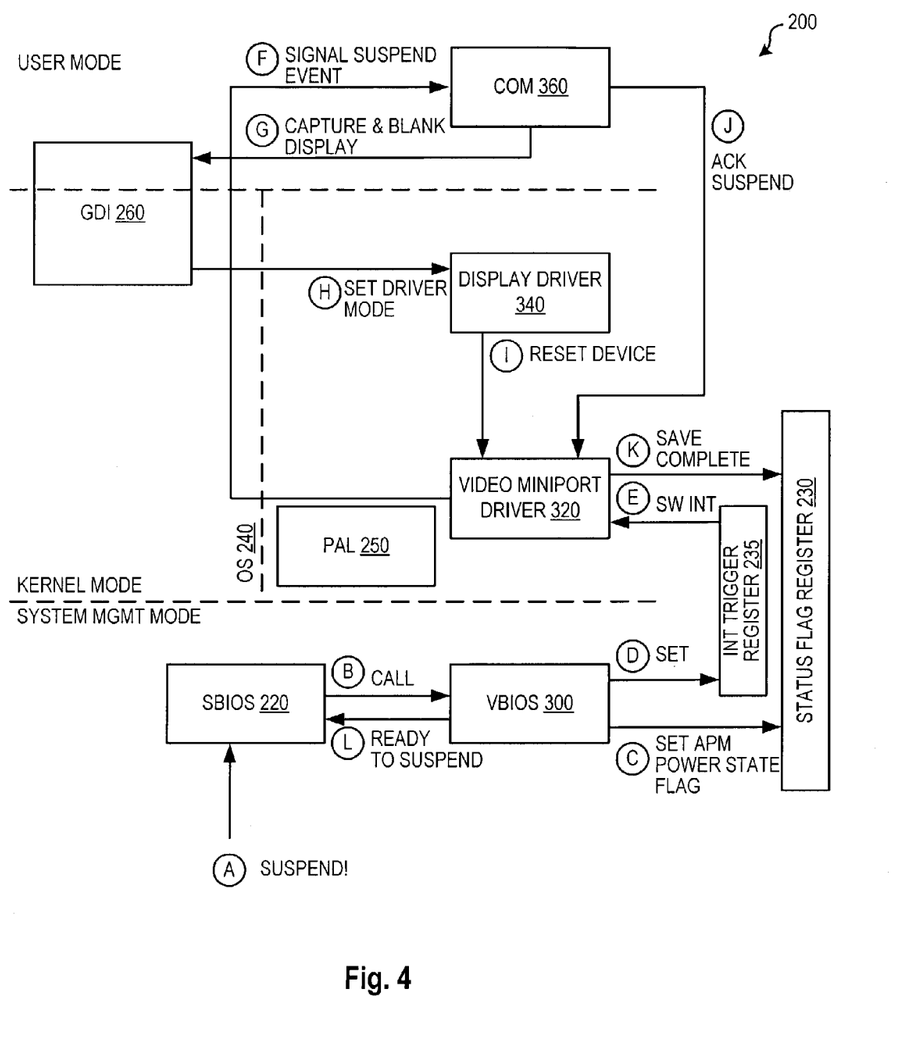
FIG. 4 shows a BIOS-initiated suspend event, and how the components of an embodiment of the invention respond to place the graphics subsystem in a quiescent state, where the OS provides no explicit support for graphics power management.
Figure 5:
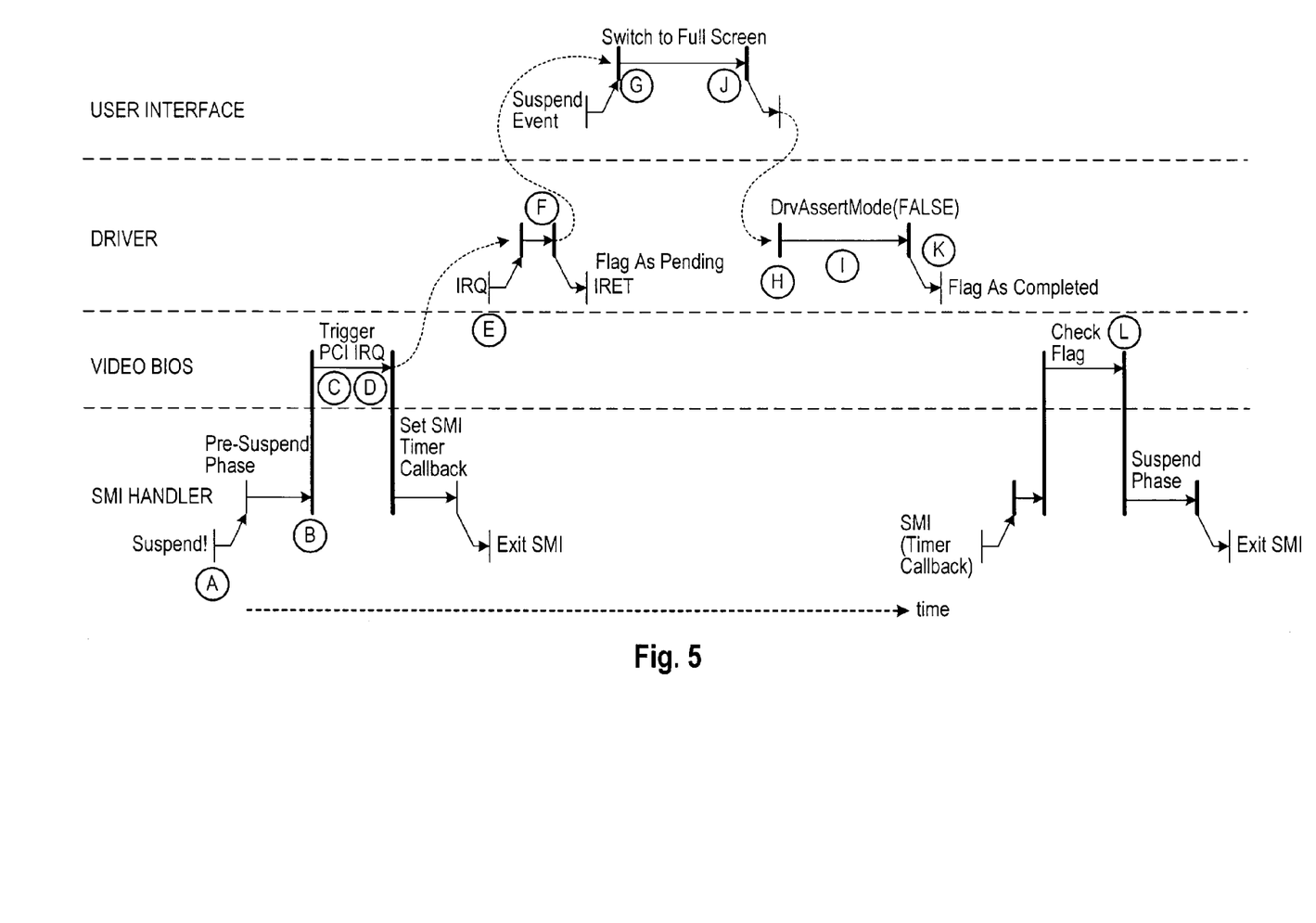
FIG. 5 shows a process timeline corresponding to the suspend event of FIG. 4.

FIGS. 4 and 5 illustrate how a properly initialized configuration 200 responds to a suspend event when no APM, ACPI, or PM driver is present. A suspend event A, caused e.g., by a user input or system timeout, causes a System Management Interrupt (SMI). The SMI places the processor in System Management Mode (SMM) and calls an SMI handler routine. The SMI handler calls the APM core in SBIOS 220, which begins executing commands in the "pre-suspend phase" (see FIG. 5). Eventually, the APM core reaches a point where it is ready to notify VBIOS 300 of the suspend event. For an Intel video BIOS, the video BIOS may be called through an interface such as the Int10h Sub-Function 5F66h routine, shown as call B in FIG. 4.

Referring back to FIG. 5, the video BIOS checks the state of registers 230 and 235, to insure, e.g., that a miniport driver is loaded and expects to handle PM events, that the driver has unmasked its interrupt, and that an APM operation is not already pending. If these status checks are passed, video BIOS 300 sets the APM Power State flag to 2h at point C, and at point D sets interrupt trigger register 235 to cause an interrupt to the miniport driver after the processor exits from SMM. The video BIOS then returns a status to the SBIOS indicating that the driver has been signaled. The SBIOS APM core sets an SMI timer callback and exits to allow the driver to process the interrupt request.

When SMM exits to the OS context and the processor begins kernel mode processing, it processes the interrupt request (IRQ) initiated by the video BIOS and calls the video miniport driver's interrupt service routine (ISR). The video miniport driver ISR reads interrupt trigger register 235 at point E and determines that an APM event has occurred. The driver then reads the APM Power State flag from status flag register 230 to determine that the event is an APM suspend event.

Miniport driver 320 then calls its routine for responding to an APM suspend event. During execution of this routine at F, miniport driver 320 calls an OS function to signal the APMSuspendEvent registered by COM 360 during initialization. Miniport driver 320 also sets the APM Status flag in register 230 to a value 1h, indicating that the suspend event is pending. The miniport driver then returns from its ISR.

The OS places the APMSuspendEvent in the message loop for COM 360. When COM 360 is called in user mode, it receives the event message and executes code that will have the effect of placing the graphics subsystem in a quiescent mode. For instance, at G, COM 360 can create a full screen, exclusive display context, and set the display mode to this context by calling a GDI function. COM 360 then fills the screen with black using another GDI function. At J, COM 360 sets the semaphore associated with APMSuspendEvent to signal that is has set the graphics in a quiescent state.

GDI 260 responds to the display mode request by signaling display driver 340, at H, to set the driver mode. In Microsoft Windows implementations, a call to DrvAssertMode with the bEnable parameter set to FALSE will cause the hardware to be reset to its default mode so that the miniport driver can assume control. The display driver, by definition, places the graphics in a quiescent state when a mode switch is requested.

At point I, display driver 340 signals miniport driver 320 to reset the graphics device. The reset signal, coupled with the semaphore set by COM 360, confirm to miniport driver 320 that graphics has successfully been placed in a quiescent state. Upon receiving notice that the hardware is in a quiescent state, miniport driver 320 will proceed to save any fragile state that may exist. At point K, driver 320 sets the APM Status flag in register 230 to indicate that the graphics state has been successfully saved, and graphics shutdown may now proceed.

According to the callback time set by the SMI handler, an SMI timer callback will cause the system at some point to reenter SMM. The SBIOS APM core calls VBIOS 300 once again. This time, when VBIOS 300 checks status flag register 230, it finds that the APM Status flag indicates successful completion of a graphics transition. At L, VBIOS 300 exits to the APM core with a return code indicating that the driver has completed, and is ready for the graphics suspend. SBIOS 220 can then remove power from graphics components.

Several attractive features are evident in the solution just described. One, the modifications necessary to support this OS-independent procedure by and large reside within the graphics software. Two, this solution provides synchronization between software that is truly asynchronous at the user, kernel, and system management levels. Three, this solution is initiated outside of the operating system, but then works with the OS by elevating the power event all the way up to the user level, so that when the event comes back down it is handled just like any other user event. This not only ensures that the driver can handle the event cleanly, but also ensures that other applications will be notified of the event and have a chance to respond (since GDI will notify all applications, in a way that they understand, that a display mode switch is imminent). The ability of this method to leverage OS behavior to effect PM, even though the OS may not explicitly handle power management events, is a true advantage over an approach that would attempt to handle power transitions independent of the OS environment.

Figure 6:
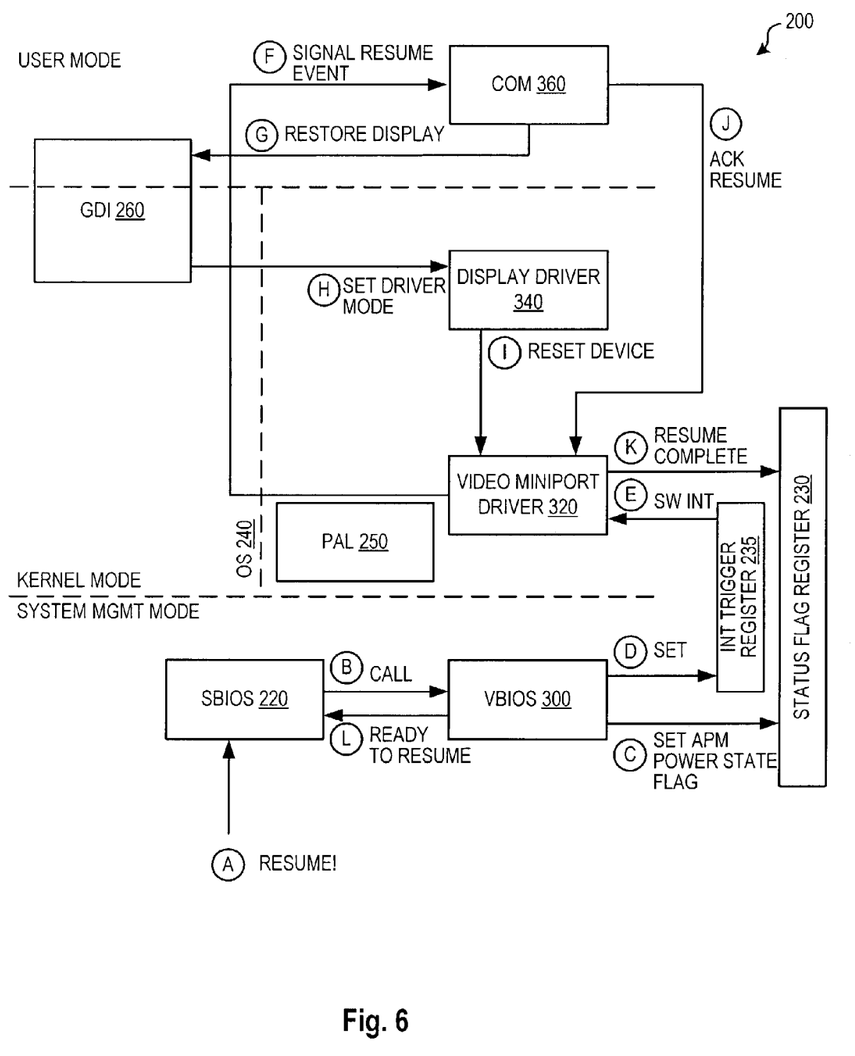
FIG. 6 illustrates a BIOS-initiated resume event to resume graphics after the suspend event of FIG. 4.
Figure 7:
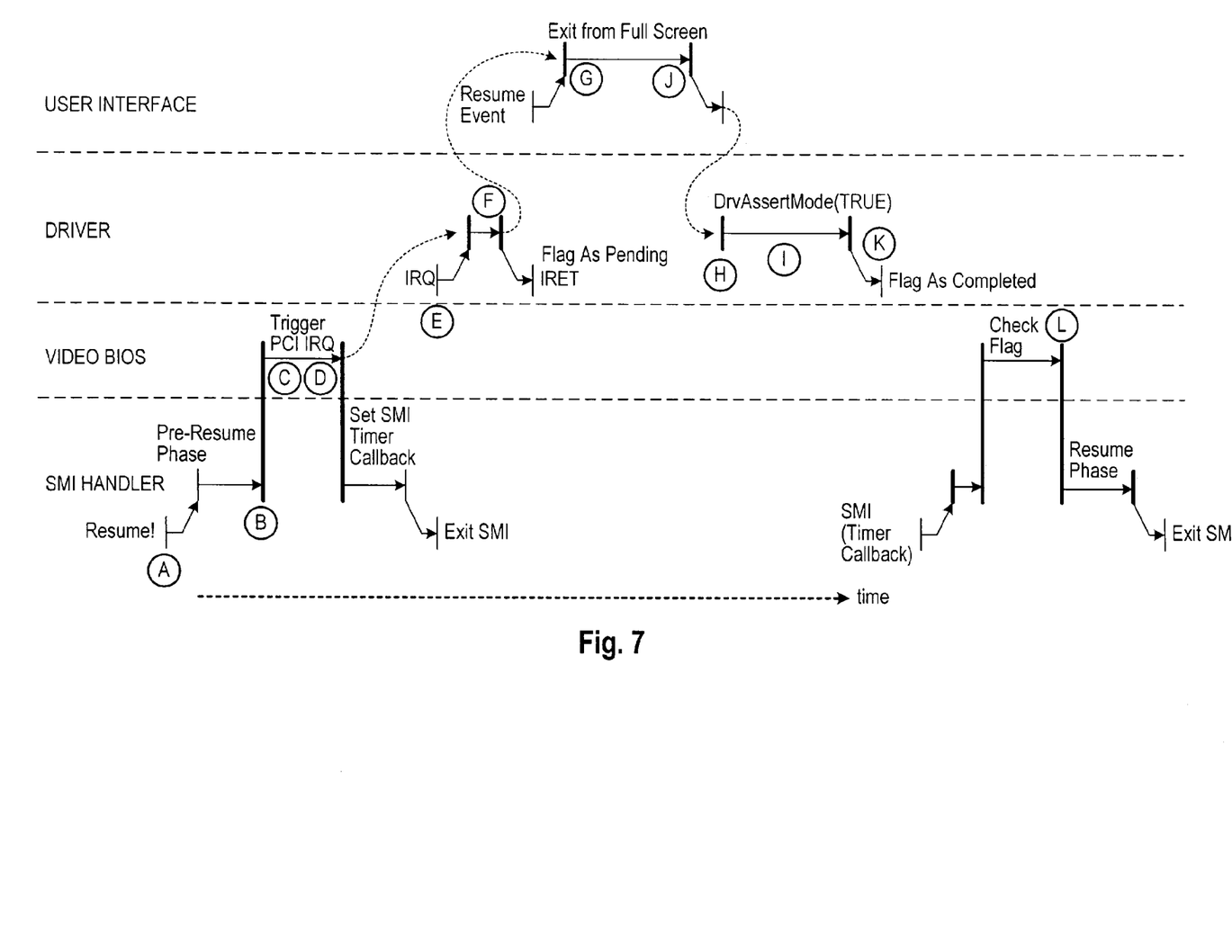
FIG. 7 shows a process timeline corresponding to the resume event of FIG. 6.

FIGS. 6 and 7 show an analogous procedure for resuming the graphics state that existed prior to the suspend operation of FIGS. 4 and 5. In response to an APM resume event, the same procedure as described in the preceding example is followed, with the following differences. At point C, the APM Power State flag is set to 4h, indicating that the system is transitioning to APM resume. At point F, the video miniport driver restores any fragile state that it has saved on suspend, and signals APMResumeEvent. COM 360 recognizes this message as a request to exit exclusive, full screen mode, and responds at G by calling DrvAssertMode with the bEnable parameter set to TRUE, to return the graphics to the original state it was in prior to the suspend operation. Finally, video miniport driver 320 looks for the semaphore associated with APMResumeEvent at J.

The preceding discussion has not addressed the state of the flags APM BIOS Memory Allocated and Pipeline State Saved. Assuming that the video BIOS was responsible for saving the graphics fragile state, it would have been informed to save graphics state via these flags. Normally, however, the miniport driver is responsible for saving and restoring state, and would do so after COM 360 has set the driver mode. In some instances, a DrvAssertMode(FALSE) call will automatically cause state to be saved; otherwise, the miniport driver can call a helper routine (e.g., through a Deferred Procedure Call or DPC) to save the state.

Figure 8A:
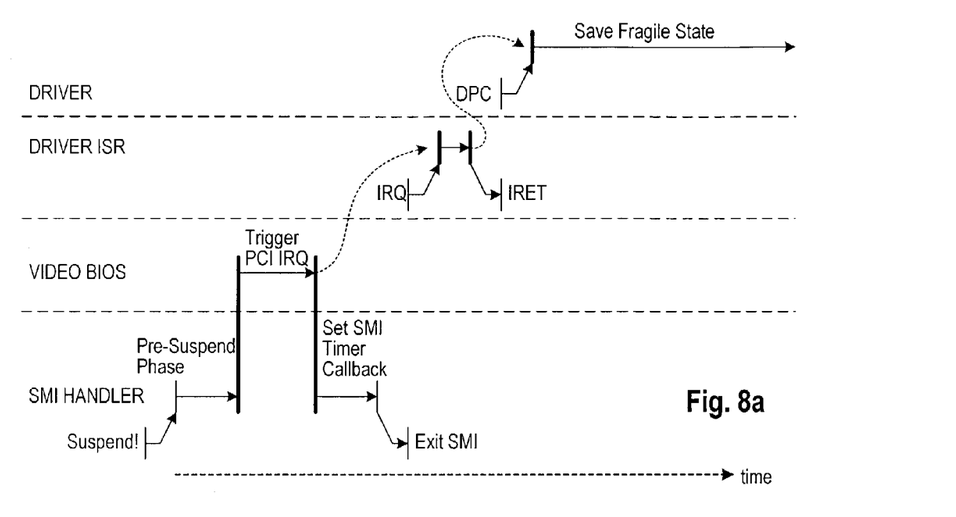
FIGS. 8a, 8b, and 8c illustrate video BIOS/video driver co-operation in saving graphics state.
Figure 8B:
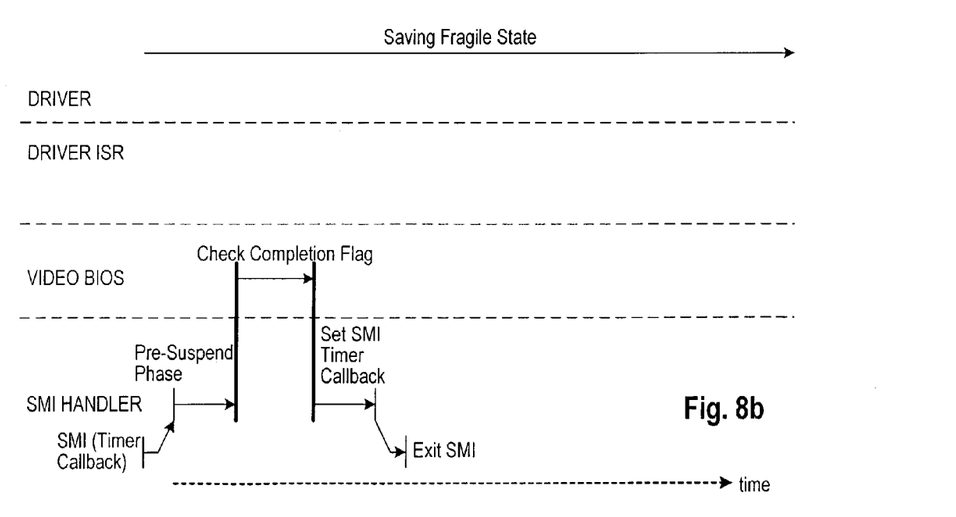
Figure 8C:
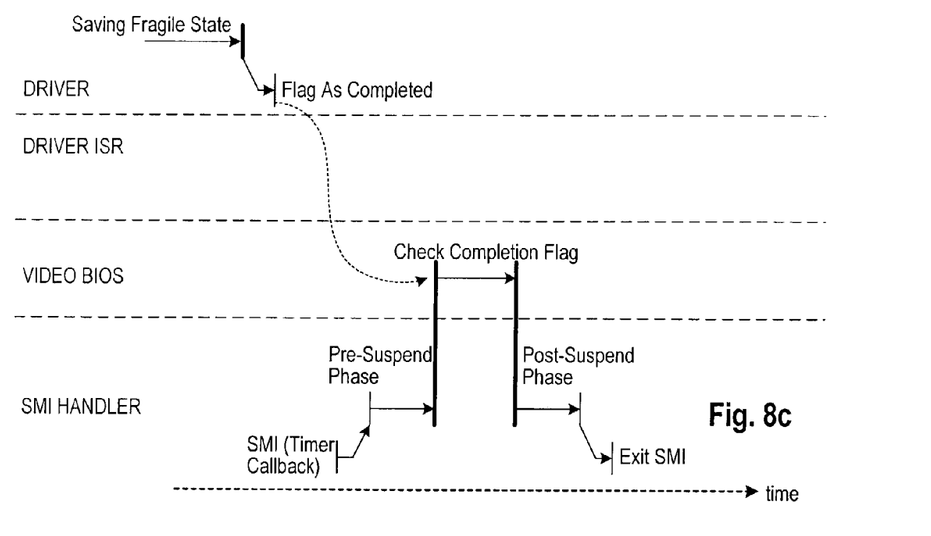

FIGS. 8A, 8B, and 8C show this process for one situation. In FIG. 8a, processing proceeds similar to FIG. 5, except that the miniport driver ISR detects that it is to save fragile state, and calls, e.g., PAL 310 to begin saving state.

In FIG. 8b, the SMI timer callback causes the processor to reenter SMM. Since the miniport driver is still saving graphics state, the video BIOS reads the status flag register, notifies the SBIOS that the save is still pending, and the SBIOS APM core then sets another SMI timer callback.

In FIG. 8c, the miniport driver completes saving the graphics state, and sets the APM Status flag to indicate successful completion. On the next SMI timer callback, the VBIOS detects successful completion, and notifies the SBIOS that suspend can now proceed.

Figure 9:
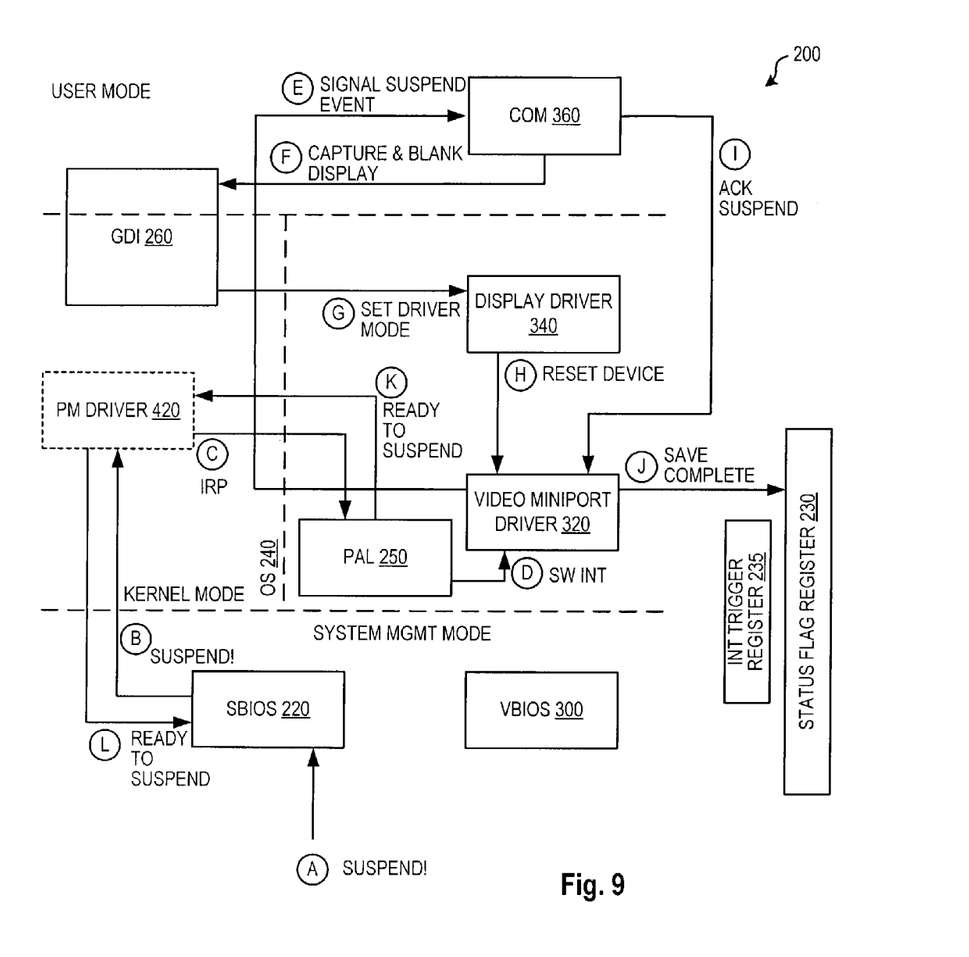
FIG. 9 depicts a BIOS-initiated suspend event causing graphics to enter a quiescent state in an embodiment of the invention, where the OS provides no explicit support for graphics power management but the platform includes a third-party power management (PM) driver.

The previously described embodiments are also intended to be configurable so as to cooperate with a PM driver to provide similar advantages. For instance, FIG. 9 illustrates how a suspend event is processed with a resident PM driver cooperating with the graphics software. When the suspend event A is received by the APM core in SBIOS 220, it passes notification of the suspend event to PM driver 420 at B (via some method that will depend on the PM driver vendor). The PM driver issues an IRP to PAL 310 at C (or notifies PAL 310 indirectly by one of the other methods previously described). PAL 310 triggers an interrupt to video miniport driver 320 at D, which causes the miniport driver to execute the same routines that were executed when it was interrupted by the video BIOS in the previous example. Event processing proceeds through COM 360, GDI 260, display driver 340, and back to video miniport driver 320 as previously described. At J, video miniport driver 320 sets the APM Status flag in register 320 to indicate success. On the next callback to PAL 310 by PM driver 420, PAL 310 observes that the APM Status flag is set, and signals PM driver 420 at K that the graphics subsystem is ready to suspend. At L, PM driver signals SBIOS 220 (by whatever means it has defined) that graphics may be suspended.

Timing diagrams and the resume graphics process flow have not been illustrated explicitly for the PM driver case of FIG. 9, as such are fairly evident from the material previously presented. It is noted, however, that although it is possible that SBIOS 220 may still call VBIOS 300 during a PM event in this configuration, VBIOS 300 will recognize from the status flag register contents that a PM driver is resident, and will not attempt power management.

Figure 10:
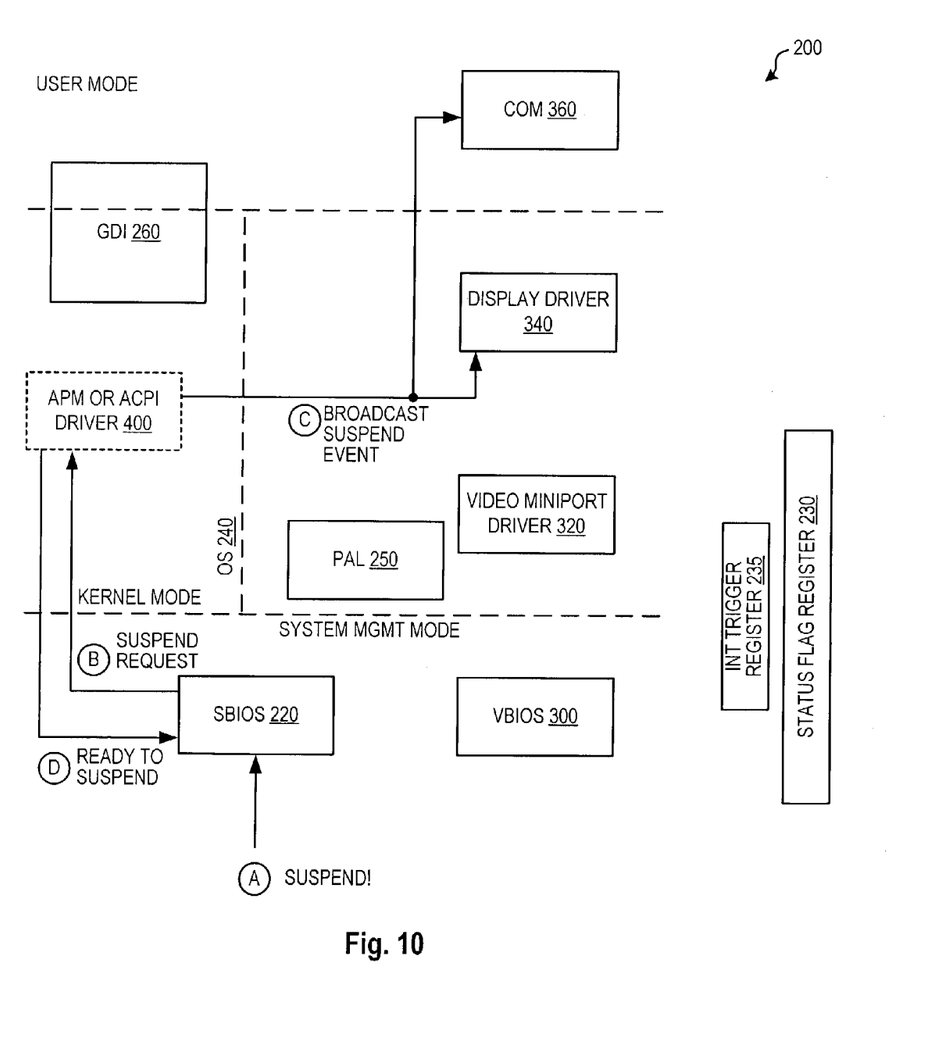
FIG. 10 depicts a BIOS-initiated suspend event for an embodiment of the invention, where an APM or ACPI driver resides in the OS.

FIG. 10 shows a configuration with an APM or ACPI driver 400 loaded with the OS. In this case, the video miniport driver 320 has set the status flag register 230 to indicate that support will be provided by driver 400, thereby disabling the separate PM functionality existing in COM 360, display driver 340, video miniport driver 320, PAL 310, and VBIOS 300. Suspend request B and reply D are handled in the appropriate APM or ACPI way. The APM or ACPI driver broadcasts the suspend event at C to registered applications, which may include COM 360 and display driver 340. Although these components may react to the event broadcast using the prior technique for capturing the display and setting a quiescent state, such measures are likely unnecessary. The described graphics PM functionality remains in place, however, in case the system is booted with a different OS.

Although the preceding description uses a graphics subsystem as an exemplary application of the invention, similar principles can be used to effect power management support for other computer subsystems. The subsystem needs some power-management firmware that can receive notification of power management events, a device driver, and a defined register that can be used to asynchronously pass power management status flags between the two. A support application should also exist to respond to power management event notification from the device driver by issuing commands to place the subsystem in a safe state during transitions to a lower power state, and to restore the original state when the subsystem returns to a fully operational power state.

Many variations on the above embodiments will become apparent to those skilled in the art upon reading this disclosure. The specific interrupt and messaging techniques, flag definitions and format, software partitioning, and sequencing that have been disclosed are merely part of one group of techniques for implementing one set of embodiments, and many others may serve equally well in a given situation. Some operating systems will distribute driver component functionality differently, and may even place driver components at the user level. It is acknowledge that some functions described as software could be implemented in hardware as well. One of ordinary skill in the art will recognize that the concepts taught herein can be tailored to a particular application in many other advantageous ways.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A computer system comprising:
   system BIOS (Basic Input/Output System) firmware capable of power managing at least some system hardware;
   video BIOS firmware, specific to an installed graphics device, the video BIOS firmware capable of communicating with the system BIOS firmware regarding power management events in the absence of a power management driver;
   a graphics driver capable of receiving a power management event notification from at least one of the system BIOS and the video BIOS firmware and signaling that event to an application; and
   an application capable of receiving power mode event notification from the graphics driver, and capable of responding to such notification by issuing graphics commands that will allow the graphics device to be placed in a quiescent graphics state prior to transitions to a lower power state, and to restore prior graphics state upon transition back to an operational power state.

2. The computer system of claim 1, further comprising a software-writeable status flag register accessible to the video BIOS firmware and the graphics driver, the status flag register comprising defined power management status flags, the video BIOS firmware and the graphics driver using the status flags to share information regarding power management configuration and state.

3. The computer system of claim 2, wherein the status flags comprise a power state flag settable by the video BIOS firmware to notify the graphics driver of a requested power management event.

4. The computer system of claim 3, wherein the graphics driver is capable of resetting the power state flag to acknowledge to the video BIOS firmware that the power state notification has been received.

5. The computer system of claim 3, wherein the status flags further comprise a driver status flag settable by the graphics driver to inform the video BIOS firmware of the status of a graphics save or restore operation initiated in response to the power management event notification.

6. The computer system of claim 2, wherein the status flags comprise a driver present flag settable by the graphics driver to inform the video BIOS firmware when the graphics driver is loaded and available to participate in servicing power management events.

7. The computer system of claim 2, wherein the status flags comprise at least one power management driver installed flag settable by the graphics driver to inform the video BIOS firmware that the video BIOS firmware will co-operate with the graphics driver to service power management events.

8. The computer system of claim 2, wherein the status flags comprise at least one state-saving flag settable by the graphics driver to inform the video BIOS firmware as to whether the video BIOS firmware is expected to save graphics state.

9. The computer system of claim 1, wherein the graphics driver comprises a platform abstraction layer to communicate with a power management driver when a power management driver is present, a miniport driver to communicate with the video BIOS firmware and the application, and a display driver to receive and process graphics commands.

10. The computer system of claim 1, further comprising a platform abstraction layer to communicate with a power management driver, when a power management driver is installed, the platform abstraction layer capable of notifying the graphics driver of power management events communicated to the platform abstraction layer by the power management driver.

11. The computer system of claim 1, wherein the video BIOS firmware communicates power management event notification to the graphics driver, the video BIOS firmware sending power management event notification by setting a register flag, readable by the graphics driver, to indicate the event, and causing an interrupt that is serviced by the graphics driver.

12. The computer system of claim 1, wherein the graphics commands issued by the application are operating system graphics commands that cause the operating system to place the graphics subsystem in a quiescent state, or into a state from which the graphics subsystem can be quiesced under control of the application.

13. A computer system comprising:
    system BIOS firmware capable of power managing at least some system hardware;
    a hardware register comprising software-writeable power management status flags;
    a device driver for an installed device, the device driver capable of signaling the occurrence of power management events to an application;
    power management firmware capable of communicating with the system BIOS firmware regarding power management events, in the absence of a power management driver; and
    an application capable of receiving power mode event notification from the device driver, and responding to such notification by issuing commands to protect state information, related to the installed device, across power transitions; wherein
    the power management firmware and the device driver are capable of communicating with each other asynchronously regarding power management events, using the status flags in the hardware register.

14. The computer system of claim 13, wherein the device driver uses the status flags in the hardware register to communicate to the power management firmware whether the power management firmware is needed to participate in power management.

15. The computer system of claim 13, wherein the power management firmware is located within video BIOS firmware, and wherein the device driver is a video miniport driver.

16. A method of power managing a device in a computer system, the method comprising:
    communicating a power transition notification from firmware to a device driver;
    in response to the power transition notification, the device driver signaling a corresponding power mode event to an application;
    in response to the signaled power mode event notification, the application issuing commands to place the device in an appropriate state for the power transition;
    after the issued commands have completed, the application signaling the device driver that the device is ready for the power transition; and upon receiving signaling from the application, the device driver signaling the firmware that the device is ready for the power transition.

17. The method of claim 16, wherein communicating a power transition notification from firmware to a device driver comprises setting a power state flag in a register readable by the device driver, and setting a register interface that allows firmware to cause an interrupt request originating from the device, the device driver servicing the interrupt request by:
interpreting the interrupt request as a request to read the power state flag;
reading the power state flag; and
interpreting a power status change from the power state flag.

18. The method of claim 17, wherein the register is writeable by the device driver and readable by the firmware, the method further comprising the device driver acknowledging the power transition notification by resetting the power state flag.

19. The method of claim 17, further comprising the device driver acknowledging the power transition notification by updating a driver status flag in the register to indicate an operation pending condition, and further updating the driver status flag in the register to indicate an operation completed condition to signal the firmware that the device is ready for the power transition.

20. The method of claim 19, further comprising, after issuing the interrupt request, setting a callback timer to the firmware, the firmware upon callback checking the status of the driver status flag.

21. The method of claim 20, wherein when upon checking the status of the driver status flag the flag indicates an operation pending condition, the method further comprising repeatedly setting a timed callback to the firmware and checking the status of the driver status flag upon callback, until the driver status flag indicates an operation completed condition.

22. The method of claim 16, wherein the device is a graphics device and the application is a graphics application, and wherein the graphics application issuing commands comprises issuing operating system graphics commands to cause a change in display mode under exclusive application control.

23. The method of claim 22, wherein the operating system graphics commands cause other applications to be notified of the transition in display modes and the graphics application's exclusive access to the graphics device.

24. A method of configuring a computer system to power manage a system device, the method comprising:
issuing commands from a device driver component to determine whether a power management driver is loaded on the computer system, and if such a driver is loaded, to classify the power management driver;
setting flags in a software-writeable register to indicate to other device driver and firmware components the level of support that exists in the platform for power management, and the level of support that the components provide for power management, where the level of support includes at least a first level wherein the device driver and firmware components respond to non-operating system-generated power management notification to protect device state across power transitions; and
at least one other component reading the flags to determine whether and to what extent that component will participate in power management.

25. The method of claim 24, further comprising issuing commands from an application to create named event handles for signifying power management events, and notifying the device driver of the named event handles to allow the device driver to notify the application of power management events using the named handles.

26. An article of manufacture comprising computer-readable media containing instructions that, when executed or interpreted by a processor or cooperating processors, cause that processor or processors to perform a method comprising:
issuing commands from a device driver component to determine whether a power management driver is loaded on the computer system, and if such a driver is loaded, to classify the power management driver;
setting flags in a software-writeable register to indicate to other device driver and firmware components the level of support that exists in the platform for power management, and the level of support that the components provide for power management, where the level of support includes at least a first level wherein the device driver and firmware components respond to non-operating system-generated power management notification to protect device state across power transitions, for a device serviced by device driver components; and
at least one other component reading the flags to determine whether and to what extent that component will participate in power management.

27. The article of manufacture of claim 26, further comprising issuing commands from an application to create named event handles for signifying power management events, and notifying the device driver of the named event handles to allow the device driver to notify the application of power management events using the named handles.

28. An article of manufacture comprising computer-readable media containing instructions that, when executed or interpreted by a processor or cooperating processors, cause that processor or processors to perform a method comprising:
communicating a power transition notification from firmware to a device driver for a given computer system device;
in response to the power transition notification, the device driver signaling a corresponding power mode event to an application;
in response to the signaled power mode event notification, the application issuing commands to place the device in an appropriate state for the power transition;
after the issued commands have completed, the application signaling the device driver that the device is ready for the power transition; and
upon receiving signaling from the application, the device driver signaling the firmware that the device is ready for the power transition.

29. The article of manufacture of claim 28, wherein communicating a power transition notification from firmware to a device driver comprises setting a power state flag in a register readable by the device driver, and setting a register interface that allows firmware to cause an interrupt request originating from the device, the device driver servicing the interrupt request by:
interpreting the interrupt request as a request to read the power state flag;
reading the power state flag; and
interpreting a power status change from the power state flag.

30. The article of manufacture of claim 28, wherein the device is a graphics device and the application is a graphics application, and wherein the graphics application issuing commands comprises issuing operating system graphics commands to cause a transition in display mode and graphics application exclusive device access, and wherein the operating system commands used cause other applications to be notified of the display mode change and the change in device access.

* * * * *